US 8,497,031 B2

(12) United States Patent
Reischmann et al.

(10) Patent No.: US 8,497,031 B2
(45) Date of Patent: Jul. 30, 2013

(54) COMBINED HEATING AND PRE-CHARGING FUNCTION AND HARDWARE FOR PROPULSION BATTERIES

(75) Inventors: Marc Reischmann, Wallertheim (DE); Peter Andres, Ginsheim-Gustavsburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 12/853,695

(22) Filed: Aug. 10, 2010

(65) Prior Publication Data

US 2012/0040224 A1 Feb. 16, 2012

(51) Int. Cl.
*H01M 10/50* (2006.01)
*H02J 7/10* (2006.01)

(52) U.S. Cl.
USPC .......... 429/120; 429/121; 429/123; 429/97; 320/121; 320/154; 320/137

(58) Field of Classification Search
USPC .......... 429/7, 62, 120, 150, 123, 97; 320/121, 320/154, 137
See application file for complete search history.

(56) References Cited

U.S. PATENT DOCUMENTS

| | | | | |
|---|---|---|---|---|
| 4,346,336 A | * | 8/1982 | Crawford | 320/147 |
| 5,825,155 A | * | 10/1998 | Ito et al. | 320/118 |
| 8,148,003 B2 | * | 4/2012 | Kitanaka | 429/150 |
| 2011/0057586 A1 | * | 3/2011 | Bucur | 318/139 |
| 2011/0121789 A1 | * | 5/2011 | Yang et al. | 320/152 |
| 2011/0250484 A1 | * | 10/2011 | Meng | 429/97 |
| 2012/0025780 A1 | * | 2/2012 | Xu et al. | 320/129 |
| 2012/0031890 A1 | * | 2/2012 | Han et al. | 219/209 |
| 2012/0032642 A1 | * | 2/2012 | Xu et al. | 320/128 |
| 2012/0034507 A1 | * | 2/2012 | Harada et al. | 429/120 |
| 2012/0040224 A1 | * | 2/2012 | Reischmann et al. | 429/120 |
| 2012/0141857 A1 | * | 6/2012 | Nakashima et al. | 429/120 |
| 2012/0214041 A1 | * | 8/2012 | Harada et al. | 429/120 |
| 2013/0004802 A1 | * | 1/2013 | Robertson | 429/50 |
| 2013/0004803 A1 | * | 1/2013 | Robertson | 429/50 |
| 2013/0004804 A1 | * | 1/2013 | Robertson et al. | 429/50 |
| 2013/0004805 A1 | * | 1/2013 | Robertson et al. | 429/50 |

* cited by examiner

*Primary Examiner* — Joseph S Del Sole
*Assistant Examiner* — Nahida Sultana
(74) *Attorney, Agent, or Firm* — John A. Miller; Miller IP Group, PLC

(57) ABSTRACT

A battery circuit for an electric vehicle that employs a resistor that provides both a pre-charging function at system start-up and battery heating. The battery circuit includes a positive high voltage bus line electrically coupled to a positive terminal of the battery and a negative high voltage bus line electrically coupled to the negative terminal of the battery. A first end of the resistor is electrically coupled to the positive high voltage bus line, a first switch is electrically coupled between a second end of the resistor and the positive high voltage bus line and a second switch is electrically coupled between the second end of the resistor and the negative high voltage bus line. The pre-charging operation is provided when the first switch is closed and the second switch is opened and the heating function is provided when the second switch is closed and the first switch is opened.

20 Claims, 2 Drawing Sheets

COMBINED HEATING AND PRE-CHARGING FUNCTION AND HARDWARE FOR PROPULSION BATTERIES

BACKGROUND OF THE INVENTION

1. Field of the Invention

This invention relates generally to a battery circuit for an electric vehicle and, more particularly, to a battery circuit for an electric vehicle that employs a single resistor that provides both a pre-charge function and a battery heating function.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery for an electric vehicle may include 196 battery cells providing about 400 volts of power. The battery can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

The high voltage battery in an electric vehicle is selectively coupled to the vehicle's high voltage bus by battery contactors. When the vehicle is shut off, the contactors are opened and the battery is disconnected from the high voltage bus. When the vehicle is switched on, the contactors are closed and the battery voltage is coupled to the high voltage bus.

Several other high voltage components are electrically coupled to the high voltage bus, including a traction motor inverter module (TPIM) that inverts the DC high voltage bus signal to an AC signal suitable for the AC propulsion motors in the vehicle. The TPIM and other modules and circuits coupled to the high voltage bus generally include a relatively large capacitor coupled across the positive and negative lines of the high voltage bus that filter bus voltage noise that may otherwise have a degrading effect on the performance of the module. However, as the battery contactors are being closed and the battery voltage is coupled to the high voltage bus lines, these capacitors act as a direct short across the bus lines until the capacitor has had an opportunity to charge, which is generally only a few milliseconds. This limited time direct short has a degrading effect on many of the electrical components in the system as a result of the high voltage, including the capacitor itself and the contactors, which limits their life.

In order to eliminate or reduce this current spike from the direct short at system start-up, it is known to provide a pre-charge resistor in the battery circuit that operates as a load to limit the current while the several capacitors are being charged. In other words, the pre-charge resistor pre-charges the vehicle's high voltage bus prior to closing the main bus contactors during vehicle start-up in order to avoid high in-rush current spikes that may otherwise damage the high voltage capacitors. In one particular design, a negative battery contactor is closed at start-up and the pre-charge resistor is coupled across the positive bus contactor, which remains open until the pre-charge function is completed.

It is well known in the industry that high temperatures can be detrimental to a vehicle battery, and that most types of battery packs produce heat when being discharged during vehicle driving operations. It is also known that the life of lithium-ion battery packs is a function of both temperature and state-of-charge of the battery pack, where high temperatures may be detrimental to battery pack life if those temperatures occur when the battery pack is in a high state-of-charge. Therefore, electric vehicles typically employ a thermal management system to maintain battery pack temperature at a certain level that is known to extending battery pack life. The battery thermal management system typically includes an electric heater provided within a cooling fluid that heats the cooling fluid to raise the temperature of the battery to an optimal temperature during cold operating conditions for better performance.

SUMMARY OF THE INVENTION

In accordance with the teachings of the present invention, a battery circuit for an electric vehicle is disclosed that employs a single resistor that provides both a pre-charging function at system start-up and battery heating when requested. The battery circuit includes a positive high voltage bus line electrically coupled to a positive terminal of the battery and a negative high voltage bus line electrically coupled to the negative terminal of the battery. A first end of the resistor is electrically coupled to the positive high voltage bus line, a second end of the resistor is electrically coupled to the negative high voltage bus line, a first switch is electrically coupled between the second end of the resistor and the positive high voltage bus line and a second switch is electrically coupled between the second end of the resistor and the negative high voltage bus line. The pre-charging operation is provided when the first switch is closed and the second switch is opened and the heating function is provided when the second switch is closed and the first switch is opened.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a battery circuit that employs a single resistor for both a pre-charge function and a heating operation is merely exemplary in nature, and is no way intended to limit the invention or its applications or uses. For example, the battery circuit of the invention is described herein as being for an electric vehicle, including electric hybrid vehicles. However, as will be appreciated by those skilled in the art, the battery circuit may be applicable for other applications.

Figure 1:
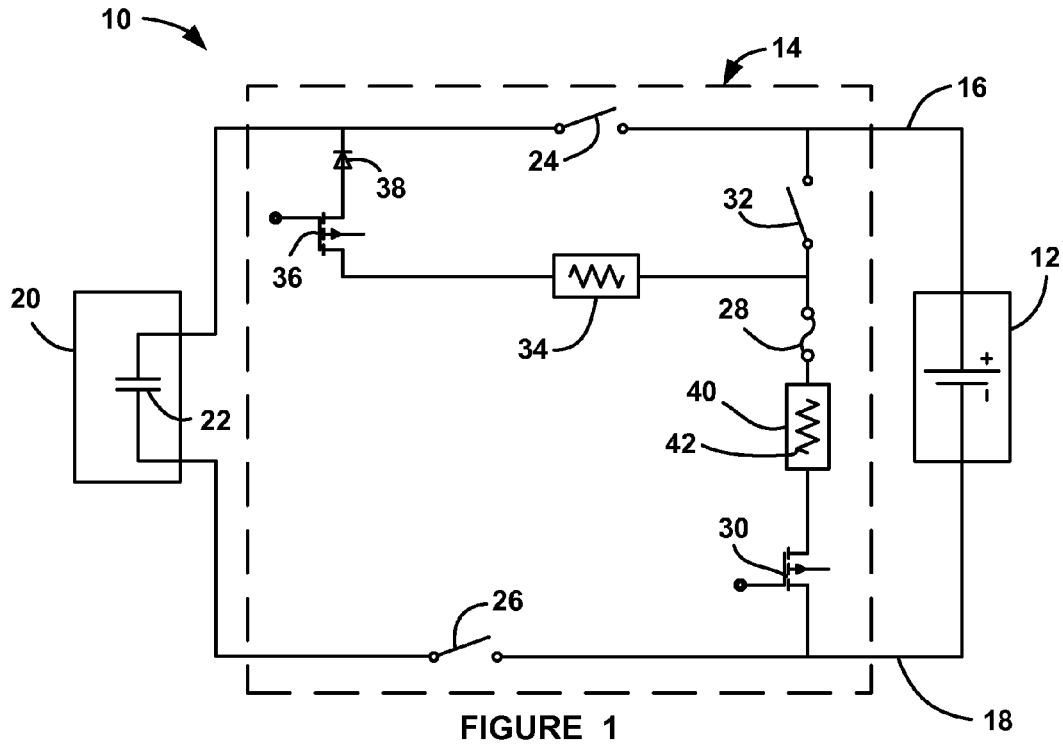
FIG. 1 is a schematic diagram of a known battery circuit for an electric vehicle that includes a pre-charge resistor and a heater.

FIG. 1 is a schematic diagram of a known battery circuit 10 including a battery 12 and a battery disconnect unit (BDU) 14. The battery 12 can be any battery suitable for the purposes described herein, such as a nickel metal hydride battery, a lithium-ion battery, a lead-acid battery, etc. The battery 12 includes a plurality of battery cells electrically coupled in series and/or in parallel to provide the desired high voltage for this particular application. The battery 12 is electrically coupled to a high voltage bus shown here as a combined positive bus line 16 and negative bus line 18. Various high voltage components would be electrical coupled to the bus lines 16 and 18 for the particular application. In the circuit 10, one of those components is a TPIM 20 that couples the high voltage on the bus lines 16 and 18 to an AC traction motor (not shown). Other high voltage electrical components would be coupled to the bus lines 16 and 18, although not specifically shown. As mentioned above, the electrical components that are coupled to the high voltage bus lines 16 and 18 typically include a capacitor to filter bus noise, where capacitor 22 is provided in the TPIM 20 as an illustration of this.

The positive bus line 16 includes a positive battery contactor or switch 24, such as a relay, and the negative bus line 18 includes a negative contactor or switch 26, where the switches 24 and 26 selectively connect and disconnect the battery 12 to the high voltage bus on the vehicle in a manner that is well understood by those skilled in the art.

The battery circuit 10 also includes a pre-charge resistor 34 electrically coupled to the positive bus line 16 in a manner that allows it to by-pass the switch 24 when a heater switch 32 is closed. The pre-charge resistor 34 can be selectively coupled to the positive bus line 16 by an FET switch 36 that receives a logic signal at its gate terminal through appropriate high voltage isolation electronics (not shown) to close the switch 36. A high voltage blocking diode 38 prevents current flow from the positive bus line 16 to the resistor 34 when the switch 24 is closed during operation of the system. As discussed above, the pre-charge resistor 34 provides a load at system start-up when the capacitor 22, and other capacitors, provide a direct short across the bus lines 16 and 18 to prevent damage to the capacitor 22, the switches 24 and 26, and other electrical components.

As mentioned above, some battery thermal management systems employ heaters to raise the temperature of the battery 12 to a desirable operating temperature. The circuit 10 includes a resistive electric heater 40 including a resistor 42 for this purpose that is electrically coupled to across the bus lines 16 and 18 when the heater switch 32 is closed. The resistor 42 would typically have a significantly higher resistance than the pre-charge resistor 34. An FET switch 30 selectively turns on the heater 40 when it receives a signal at its gate terminal to close the switch 30 through suitable high voltage isolation circuitry (not shown), as is well understood by those skilled in the art. A fuse 28 provides over current protection for the battery circuit elements.

Figure 2:
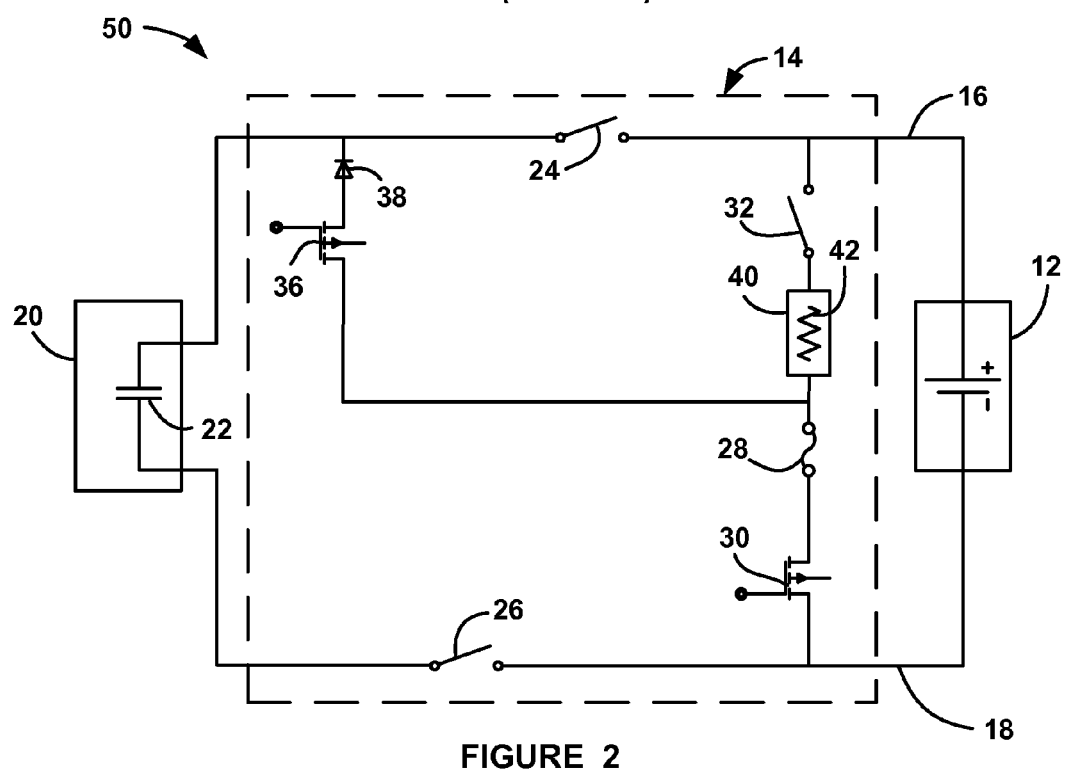
FIG. 2 is a schematic diagram of a battery circuit for an electric vehicle that employs a single resistor that provides both a pre-charge function and a heating function.

FIG. 2 is a schematic diagram of a heater circuit 50 similar to the heater circuit 10, where like elements are identified by the same reference number. According to the invention, the pre-charge resistor 34 is eliminated and the resistor 42 provides both the heating function for raising the temperature of the battery 12 and the pre-charge function. The resistor 42 would still be positioned within the cooling fluid of the thermal battery system to heat the cooling fluid when desired, but is also selectively used as a load to perform the pre-charging function.

In this regard, the switch 36 would still be used to switch on the pre-charge function where it electrically couples the heater 40 to the positive bus line 16 as in the circuit 10 when the switch 32 is closed. The switch 30 would still connect the heater 40 to the positive and negative bus lines 16 and 18 when the switch 32 is closed. Both of the switches 36 and 30 cannot be closed at the same time. If both heating and pre-charging were desired at the same time, then the pre-charge function would take precedent where the switch 30 would be open. This is because the pre-charge operation would be very quick, typically on the order of less than 300 milliseconds. Once the pre-charge operation was completed, then the switch 36 would be opened and the switch 30 would be closed to again provide the heating function, if desired.

In this embodiment, the resistance of the resistor 42 is selected for the desired and proper heating, which would typically be a higher resistance than is necessary for the pre-charge function. However, the time frame for providing the pre-charge function could be increased to provide the proper pre-charging for the desired heating resistance. Alternately, if it was desirable to keep the pre-charge time the same, then the resistance of the heater resistor 42 could be reduced, which would reduce its heating capacity. Also, the control of the switch 30 to provide the heating is typically provided by a pulse width modulation (PWM) signal having a certain duty cycle. That duty cycle pulse could be decreased for the smaller resistance to provide the same of amount of heating.

Figure 3:
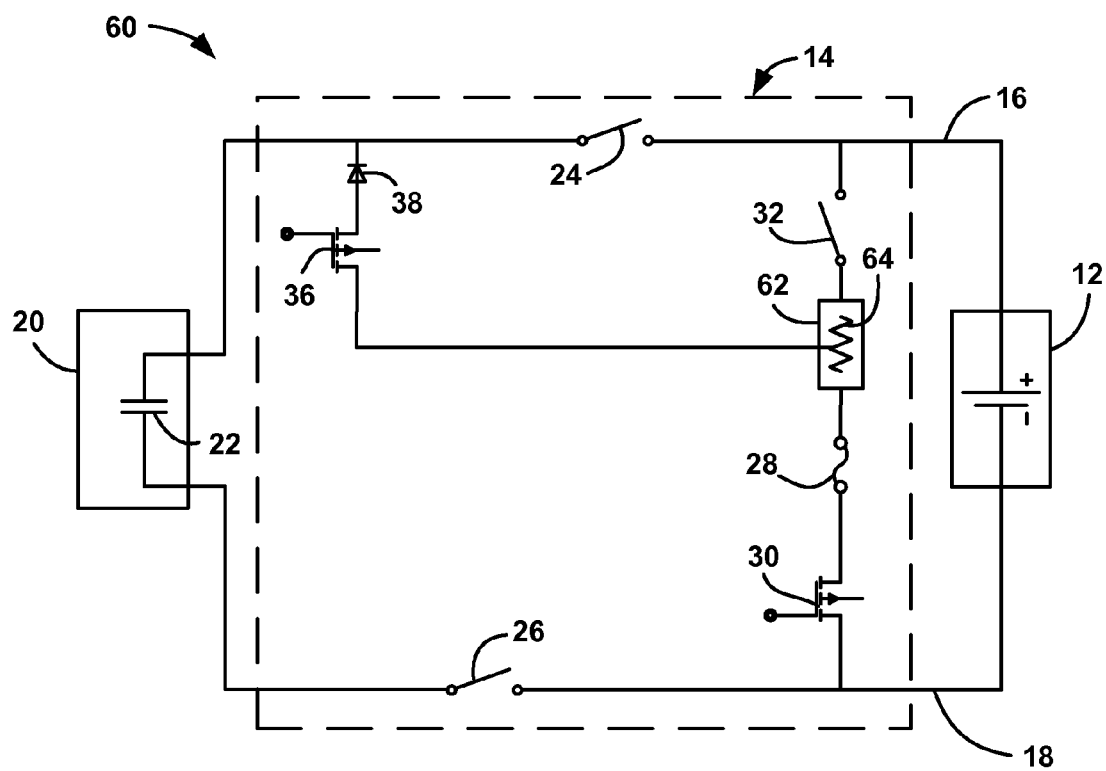
FIG. 3 is a schematic diagram of another battery circuit for an electric vehicle that employs a single resistor that provides both a pre-charge function and a heating function.

In an alternate embodiment, the heater can be a two-stage heater. This embodiment is illustrated in FIG. 3 that shows a schematic diagram of a heater circuit 60 similar to the heater circuit 50, where like elements are identified by the same reference number. The heater 40 is replaced with a two-stage heater 62 having a variable resistor 64. Only a desired portion of the resistor 64 is used during the pre-charge operation and the entire resistor 64 is used during the heating operation so that the optimal resistance can be provided for the pre-charge operation and the heating operation.

By reducing the number of resistors in the circuit 50, the number of components can be reduced which effects the cost and the weight of the system. Further, by providing a larger resistor for the pre-charging function, reliability of the pre-charging is increased.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A battery circuit comprising:
   a battery including a positive terminal and a negative terminal;
   a positive high voltage bus line electrically coupled to the positive terminal of the battery;
   a negative high voltage bus line electrically coupled to the negative terminal of the battery;
   a resistor including a first end electrically coupled to the positive high voltage bus line and a second end electrically coupled to the negative high voltage bus line;
   a first switch electrically coupled between the second end of the resistor and the positive high voltage bus line; and
   a second switch electrically coupled between the second end of the resistor and the negative high voltage bus line, said resistor separately providing both a pre-charging operation and a heating operation for heating the battery where the resistor is part of an electric heater, said first switch being closed and said second switch being opened to provide the pre-charging operation and said second switch being closed and said first switch being opened to provide the heating operation.

2. The circuit according to claim 1 further comprising a high voltage positive contactor switch provided in the positive high voltage bus line and a high voltage negative contactor switch provided in the negative voltage bus line, where the high voltage positive contactor switch is opened and the high voltage negative contactor switch is closed when the first switch is opened to provide the pre-charging operation.

3. The circuit according to claim 1 wherein the resistor has a resistance that is selected to be optimal for the heating operation.

4. The circuit according to claim 1 wherein the resistor has a resistance that is selected to be optimal for the pre-charging operation and the amount of heating provided by the resistor is controlled by a pulse width modulation signal.

5. The circuit according to claim 1 wherein the resistor is a variable resistor where a portion of the resistor is used for the pre-charging operation and more than the portion of the resistor is used for the heating operation.

6. The circuit according to claim 1 wherein the battery is a lithium-ion battery.

7. The circuit according to claim 1 wherein the resistor is positioned within a cooling fluid for a battery thermal management system.

8. The circuit according to claim 1 wherein the battery circuit is part of an electric vehicle.

9. A battery circuit for an electric vehicle, said battery circuit comprising:
   a battery;
   a high voltage bus electrically coupled to the battery;
   a resistor electrically coupled to the high voltage bus;
   a first switch electrically coupled between the resistor and the high voltage bus; and
   a second switch electrically coupled between the resistor and the high voltage bus, said resistor separately providing both a pre-charging operation and a heating operation for heating the battery where the resistor is part of an electric heater.

10. The circuit according to claim 9 wherein the first switch is closed and the second switch is opened to provide the pre-charging operation and the second switch is closed and the first switch is opened to provide the heating operation.

11. The circuit according to claim 9 wherein the high voltage bus includes a positive bus line and a negative bus line, and wherein a first end of the resistor is electrically coupled to the positive bus line and a second end of the resistor is electrically coupled to the negative bus line, the first switch is electrically coupled between the second end of the resistor and the positive bus line and the second switch is electrically coupled between the second end of the resistor and the negative bus line.

12. The circuit according to claim 11 further comprising a high voltage positive contactor switch provided in the positive high voltage bus line and a high voltage negative contactor switch provided in the negative voltage bus line, where the high voltage positive contactor switch is opened and the high voltage negative contactor switch is closed when the first switch is opened to provide the pre-charging operation.

13. The circuit according to claim 9 wherein the resistor has a resistance that is selected to be optimal for the heating operation.

14. The circuit according to claim 9 wherein the resistor has a resistance that is selected to be optimal for the pre-charging operation and the amount of heating provided by the resistor is controlled by a pulse width modulation signal.

15. The circuit according to claim 9 wherein the resistor is a variable resistor where a portion of the resistor is used for the pre-charging operation and more than the portion of the resistor is used for the heating operation.

16. The circuit according to claim 9 wherein the resistor is positioned within a cooling fluid of a battery thermal management system.

17. A battery circuit for an electric vehicle, said circuit comprising:
   a battery including a positive terminal and a negative terminal;
   a positive high voltage bus line electrically coupled to the positive terminal of the battery;
   a high voltage positive contactor switch provided in the positive high voltage bus line;
   a negative high voltage bus line electrically coupled to the negative terminal of the battery;
   a high voltage negative contactor switch provided in the negative high voltage bus line;
   a heater resistor including a first end electrically coupled to the positive high voltage bus line and a second end electrically coupled to the negative high voltage bus line;
   a first switch electrically coupled between the second end of the heater resistor and the positive high voltage bus line; and
   a second switch electrically coupled between the second end of the heater resistor and the negative high voltage bus line, said resistor separately providing both a pre-charging operation and a heating operation for heating the battery, said first switch being closed and said second switch being opened to provide the pre-charging operation and said second switch being closed and said first switch being opened to provide the heating operation, wherein the high voltage positive contactor switch is open and the high voltage negative contactor switch is closed when the first switch is opened to provide the pre-charging operation.

18. The circuit according to claim 17 wherein the heater resistor has a resistance that is selected to be optimal for the heating operation.

19. The circuit according to claim 17 wherein the heater resistor has a resistance that is selected to be optimal for the pre-charging operation and the amount of heating provided by the resistor is controlled by a pulse width modulation signal.

20. The circuit according to claim 17 wherein the resistor is a variable resistor where a portion of the resistor is used for the pre-charging operation and more than the portion of the resistor is used for the heating operation.

* * * * *